United States Patent
Ishihara et al.

(10) Patent No.: US 7,685,552 B2
(45) Date of Patent: Mar. 23, 2010

(54) SEMICONDUCTOR INTEGRATED CIRCUIT DEVICE HAVING CLOCK BUFFERS AND METHOD FOR ARRANGING THE CLOCK BUFFERS ON THE DEVICE

(75) Inventors: Fujio Ishihara, Tokyo (JP); Ryubi Okuda, Tokyo (JP); Toshihiko Himeno, Yokohama (JP); Hiroshige Fujii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 201 days.

(21) Appl. No.: 11/690,985

(22) Filed: Mar. 26, 2007

(65) Prior Publication Data
US 2007/0240087 A1    Oct. 11, 2007

(30) Foreign Application Priority Data
Apr. 7, 2006   (JP)   ............... 2006-106133
Feb. 23, 2007  (JP)   ............... 2007-043155

(51) Int. Cl.
*G06F 17/50* (2006.01)
(52) U.S. Cl. ............... 716/13; 716/5; 716/6; 716/12; 716/14; 716/15
(58) Field of Classification Search ........... 716/1, 716/12–15, 5–6
See application file for complete search history.

(56) References Cited

U.S. PATENT DOCUMENTS 6,080,206 A * 6/2000 Tadokoro et al. ............ 716/10
6,487,707 B1 * 11/2002 Kamiya ....................... 716/8
6,564,353 B2 * 5/2003 Sano ............................ 716/2
2004/0237060 A1 * 11/2004 Igarashi et al. ............. 716/12

OTHER PUBLICATIONS

D. Pham, et al., "The Design and Implementation of a First-Generation Cell Processor", ISSCC 2005/ Session 10/Microprocessors and Signal Processing/ 10.2, IEEE International Solid-State Circuits Conference, Digest of Technical Papers, Feb. 8, 2005, pp. 184-185.
Jason Cong, et al., "Matching-Based Methods for High-Performance Clock Routing", IEEE Transactions on Computer-Aided Design of Integrated Circuits and Systems, vol. 12, No. 8, Aug. 1993, pp. 1157-1169.

* cited by examiner

*Primary Examiner*—Jack Chiang
*Assistant Examiner*—Nghia M Doan
(74) *Attorney, Agent, or Firm*—Oblon, Spivak, McClelland, Maier & Neustadt, L.L.P.

(57) ABSTRACT

This invention concerns a semiconductor integrated circuit device comprising a plurality of circuit elements arranged in a chip and operating in response to a same clock signal; clock buffers arranged at intersecting points decided based on positions of the plurality of circuit elements, the intersecting points being included in intersecting points of a pseudo mesh virtually assumed to cover up a region in the chip including the plurality of circuit elements; and a main wiring transmitting the clock signal to the clock buffers.

3 Claims, 11 Drawing Sheets

SEMICONDUCTOR INTEGRATED CIRCUIT DEVICE HAVING CLOCK BUFFERS AND METHOD FOR ARRANGING THE CLOCK BUFFERS ON THE DEVICE

CROSS-REFERENCE TO RELATED APPLICATION

This application is based upon and claims the benefit of priority from the prior Japanese Patent Applications No. 2006-106133, filed on Apr. 7, 2006 and No. 2007-43155, filed on Feb. 23, 2007 the entire contents of which are incorporated herein by references.

BACKGROUND OF THE INVENTION

1. Field of the Invention

This invention relates to a semiconductor integrated circuit device and a method of designing of the semiconductor integrated circuit.

2. Related Art

A semiconductor integrated circuit device such as an LSI operates synchronously with one clock signal or a plurality of clock signals different in phase. The clock signal or clock signals supplied from outside are distributed to circuit elements, e.g., flip-flops (F/Fs), provided in the LSI and having clock terminals. By doing so, the LSI can execute such operations as data read/write operations and various arithmetic operations.

If wiring length to the flip-flop from a clock supply source differs among the respective flip-flops, a clock skew (hereinafter, sometimes simply "skew") occurs due to difference in clock signal delay. The skew is an irregularity in time for which a clock signal reaches each circuit element from the clock supply source. The skew staggers input/output timing at which the signal is input/output to each circuit element, which possibly causes the LSI to malfunction. If frequency of the clock signal is higher, the clock skew has a larger effect on the performance of the LSI. It is, therefore, more important to suppress the clock skew as the frequency of the clock signal is higher.

To prevent occurrence of the clock skew, the conventional semiconductor integrated circuit device such as the LSI is configured to arrange H-type tree wirings or repeater circuits symmetrically. The LSI in which importance is put on symmetry of the wirings or circuits can effectively reduce skew. However, such LSI has disadvantages in that the flexibility in the arrangement of the wirings in the LSI and that in the arrangement of the respective circuit elements in the LSI is decreased and wiring cost is increased.

There is also known LSI in which buffers (final-stage buffers) are arranged on routes from meshed wirings to respective flip-flops (Patent Document 1). The Patent Document 1, however, only describes that the final-stage buffers are arranged along the meshed wirings and that as many final-stage buffers are connected to respective intersecting intervals. The Patent Document 1 is silent about a detailed method of arranging the final-stage buffers.

Accordingly, the final-stage buffers could be present in a region to which it is unnecessary to supply clocks, with the result that the conventional technique has disadvantages of high cost, increase of power consumption, narrower regions for arranging the other circuit elements, and increase of circuit area.

SUMMARY OF THE INVENTION

A semiconductor integrated circuit device according to an embodiment of the present invention comprises a plurality of circuit elements arranged in a chip and operating in response to a same clock signal; clock buffers arranged at intersecting points decided based on positions of the plurality of circuit elements, the intersecting points being included in intersecting points of a pseudo mesh virtually assumed to cover up a region in the chip including the plurality of circuit elements; and a main wiring transmitting the clock signal to the clock buffers.

A method of designing a semiconductor integrated circuit device according to an embodiment of the present invention comprises setting positions of a plurality of circuit elements operating in response to a same clock signal; assuming a pseudo mesh covering up a region including the plurality of circuit elements, and setting positions of clock buffers at intersecting points decided based on the positions of the plurality of circuit elements, the intersecting points being included in intersecting points of the pseudo mesh; and setting a main wiring transmitting the clock signal to the clock buffers.

DETAILED DESCRIPTION OF THE INVENTION

Embodiments of the present invention will be explained below with reference to the accompanying drawings. The present invention is not limited to the embodiments.

First Embodiment

Figure 1:
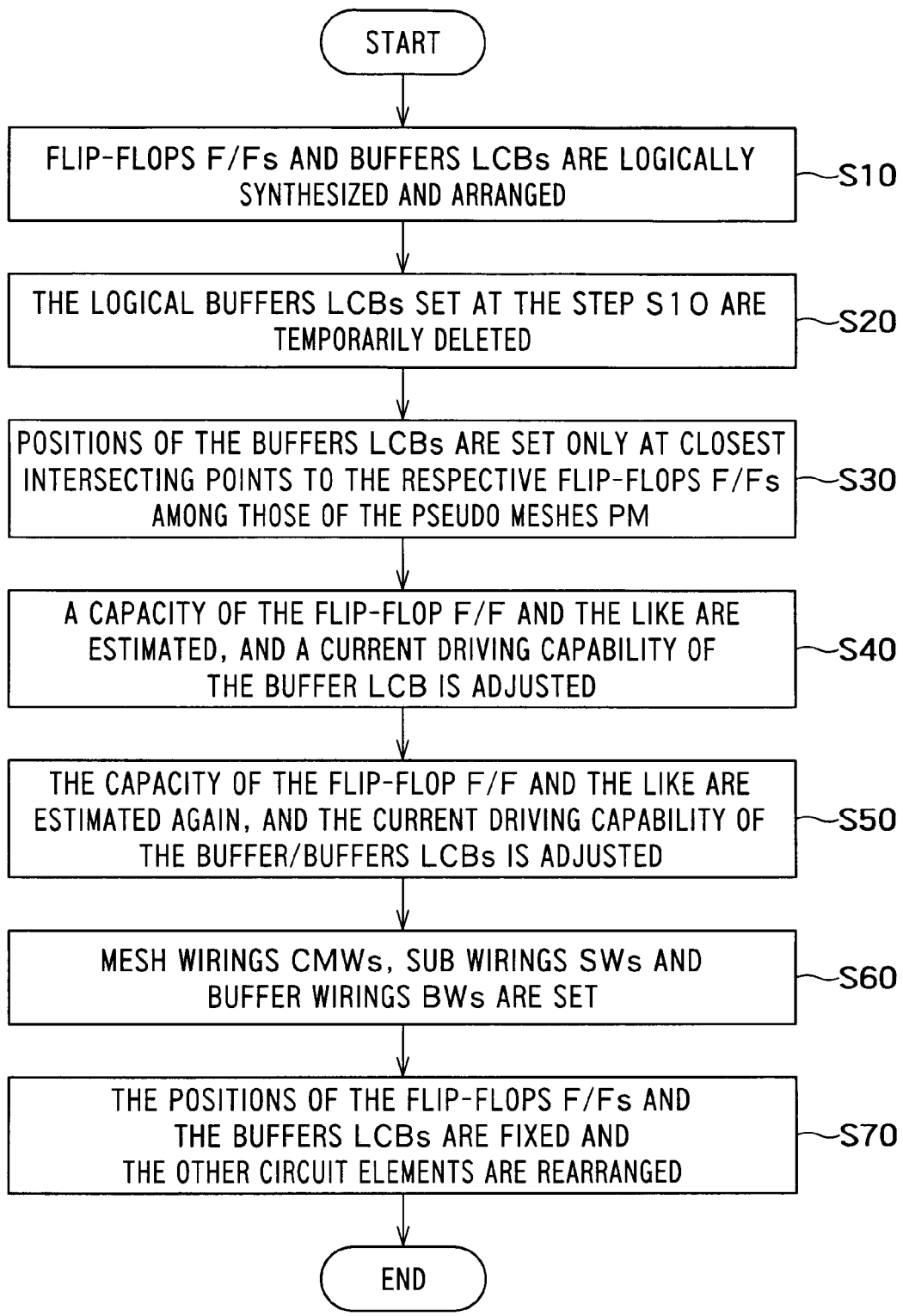
FIG. 1 is a flowchart showing a method of designing an LSI according to a first embodiment of the present invention.
Figure 2:
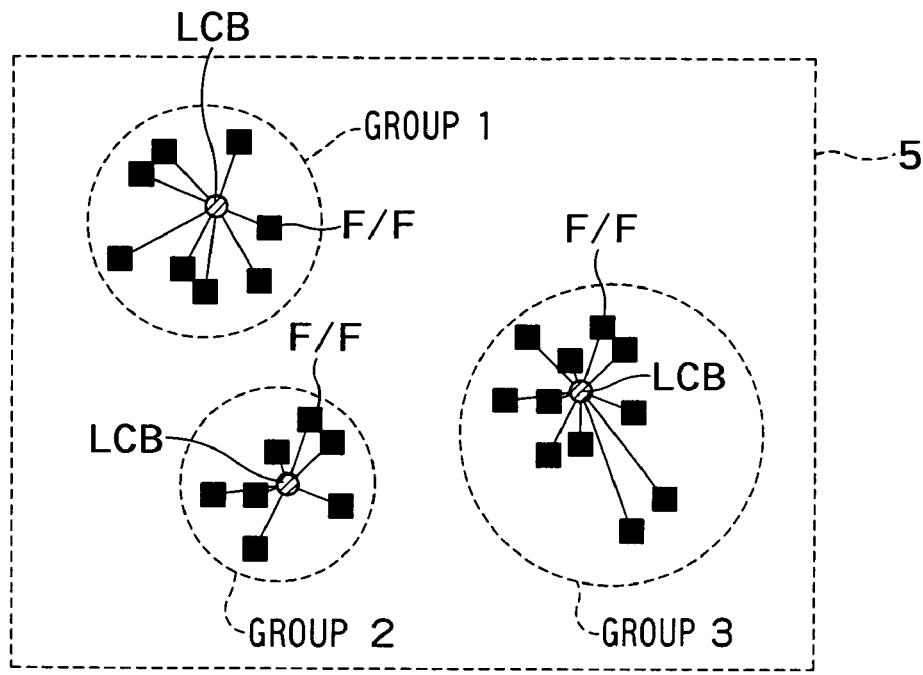
FIG. 2 is a conceptual diagram showing the method of designing the LSI according to the first embodiment.

FIG. 1 is a flowchart showing a method of designing an LSI according to a first embodiment of the present invention. FIGS. 2 to 5 are conceptual diagrams showing the method of designing the LSI according to the first embodiment. As shown in FIG. 2, flip-flops F/Fs and local area buffers (hereinafter, simply "buffers") LCBs (Local Clock Buffers) are logically synthesized and arranged (S10). FIG. 2 shows the flip-flops F/Fs and the buffers LCBs arranged in a semiconductor chip 5 at the step S10. The flip-flops F/Fs are sequential circuits for synchronizing various data for the LSI, and appropriately arranged in view of their operation timings and the like. A plurality of flip-flops F/Fs driven with the same clock signal is regarded as one group, and the logical buffers LCBs are arranged in the respective groups. In the arrangement, only one buffer LCB is present in each group and independent of the number of flip-flops F/Fs in the group. Although the arrangement of the logical buffer LCB is logically correct, the balance between a current driving capability of the buffer LCB and a load of the flip-flops F/Fs is not necessarily appropriate. It suffices to arrange the buffer LCB at an appropriate position in the flip-flop F/F group. The position of the buffer LCB is, for example, at the center or center of gravity of the entire flip-flops F/Fs in the group. It is to be noted that the flip-flops F/Fs and the buffers LCBs are nothing but logically set at the step S10.

With reference to FIG. 2, flip-flop F/F groups 1 to 3 are set in the LSI. While clock signals equal in frequency and phase are supplied to the flip-flops F/Fs in each group, clock signals different in frequency and phase can be supplied to the respective groups 1 to 3.

Figure 3:
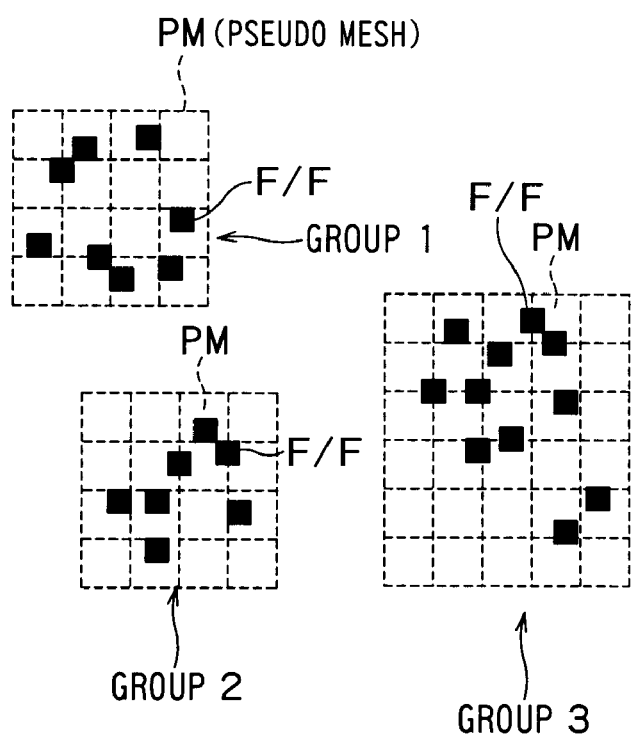
FIG. 3 is a conceptual diagram showing the method of designing the LSI following FIG. 2.

The logical buffers LCBs set at the step S10 are temporarily deleted (S20). Subsequently, as shown in FIG. 3, pseudo meshes PMs are assumed. The pseudo meshes PMs are set to correspond to the groups 1 to 3 so as to cover up respective regions of the groups 1 to 3. Mesh pitches of the pseudo meshes PMs of the groups 1 to 3 in the first embodiment are equal each other.

Figure 4:
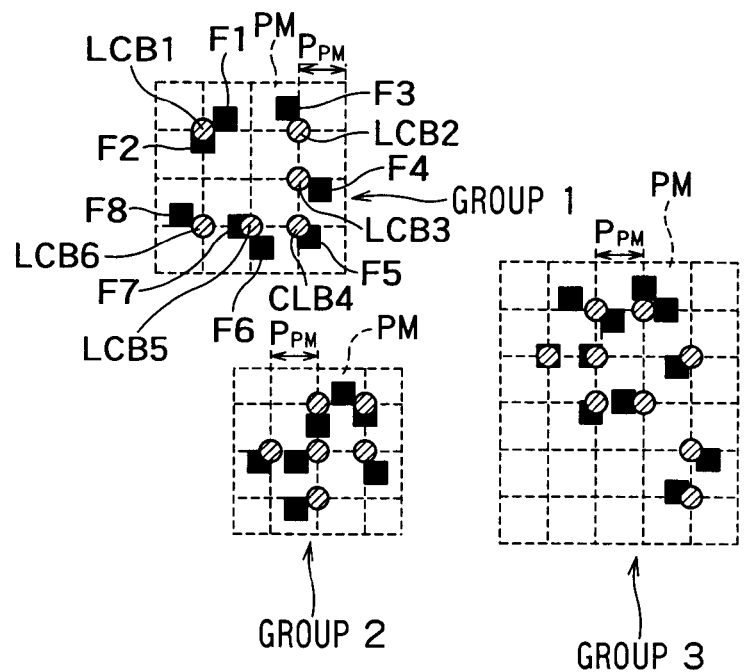
FIG. 4 is a conceptual diagram showing the method of designing the LSI following FIG. 3.

Next, the pseudo meshes PMs are assumed and the arrangement of the buffers LCBs is decided at intersecting points at which the buffers LCBs are necessary to arrange among intersecting points of the pseudo meshes PM. At this moment, as shown in FIG. 4, for example, positions of the buffers LCBs are set only at closest intersecting points to the respective flip-flops F/Fs among those of the pseudo meshes PM (S30). More specifically, as for the group 1, a buffer LCB1 is arranged at the closest intersecting point of the pseudo mesh PM to flip-flops F1 and F2. A buffer LCB2 is arranged at the closest intersecting point of the pseudo mesh PM to a flip-flop F3. Likewise, buffers LCB3, LCB4, LCB5, and LCB6 are arranged at closest intersecting points to flip-flops F4, F5, F6 and F7, and F8, respectively. Each of the buffers LCB1 and LCB5 is provided to correspond to a plurality of flip-flops F/Fs. Attention is to be paid to the fact that the buffers LCBs are provided not at all intersecting points of the pseudo meshes PMs, but only at intersecting points close to the flip-flops F/Fs.

A capacity of the flip-flop F/F, a wiring capacity, and a wiring resistance corresponding to each buffer LCB, and a current driving capability of the buffer LCB are estimated, and a current driving capability of the buffer LCB is adjusted (S40). At this step, the number of buffers LCBs arranged at one intersecting point is increased or decreased according to a total capacity (load) of the flip-flops F/Fs closest to the intersecting point. For example, if the number of flip-flops F/Fs corresponding to a certain intersecting point is large (i.e., the density thereof is high) and/or the wiring capacity of the flip-flops F/Fs with respect to the buffer LCB is large (i.e., the load thereof imposed on the buffer LCB is heavy), the number of buffers LCBs arranged at the intersecting point is increased. By doing so, the current driving capability of the buffer/buffers LCBs at each intersecting point is adapted to the capacity and the wiring capacity of the flip-flop F/F. At the step S40, however, only the number of buffers LCBs corresponding to one intersecting point is changed. Accordingly, the current driving capability of the buffer/buffers LCBs is roughly adjusted with respect to the flip-flops F/Fs and wirings and not optimized.

Therefore, the capacity of the flip-flop F/F, the wiring capacity, and the current driving capability corresponding to the buffer/buffers LCBs at each intersecting point are estimated again, and the current driving capability of the buffer/buffers LCBs is adjusted (S50). At the step S50, a size (W/L) of the buffer/buffers LCBs arranged at one intersecting point is increased or decreased according to the total capacity (load) of the flip-flops F/Fs closest to the intersecting point. For example, if the current driving capability of the buffer LCB at an intersecting point is low as compared with the capacity and/or the wiring capacity of the flip-flop F/F or flip-flops F/Fs despite no need increase the number of buffers LCBs, the size of the buffer LCB is increased. Alternatively, if the current driving capability of the buffers LCBs is high as compared with the capacity and/or the wiring capacity of the flip-flop F/F or flip-flops F/Fs as a result of increasing the number of buffers LCBs at the step S40, the size of each buffer LCB or one of the buffers LCBs is decreased. By doing so, the current driving capability of the buffer/buffers LCBs can be finely adjusted with respect to the capacity of the flip-flops F/Fs. The current driving capability of the buffer/buffers LCBs is eventually optimized with respect to the flip-flops F/Fs and the wiring.

Figure 5:
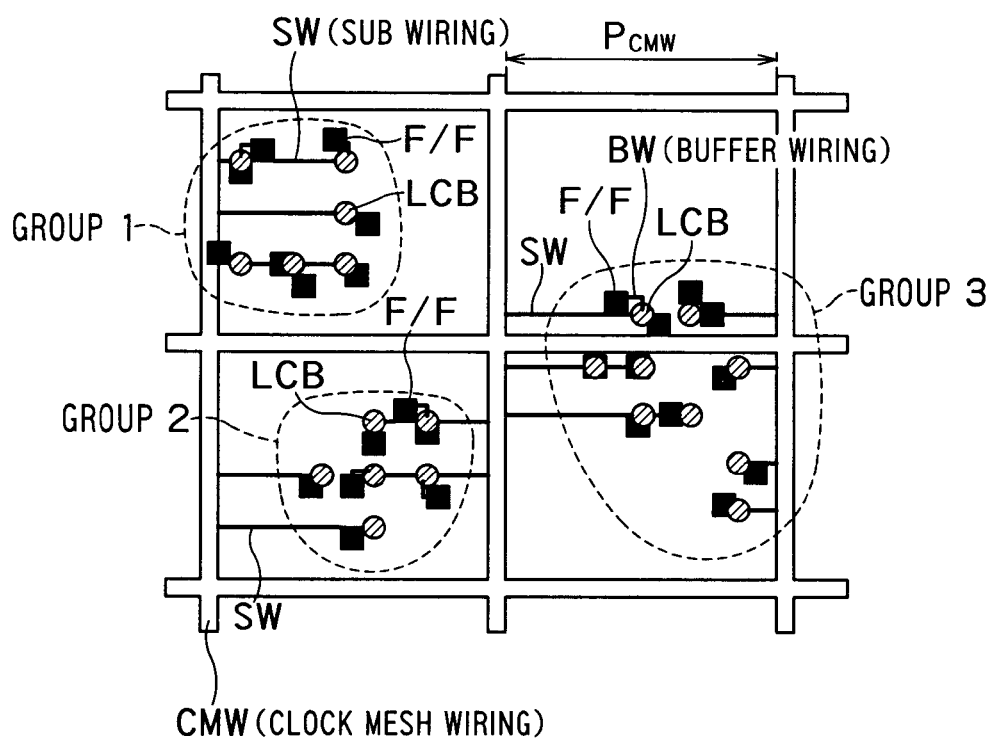
FIG. 5 is a conceptual diagram showing the method of designing the LSI following FIG. 4.

Next, as shown in FIG. 5, clock mesh wirings (hereinafter, simply "mesh wirings") CMWs serving as main wirings, sub wirings SW each connecting the mesh wiring CMW to the buffer LCB, and buffer wirings BWs connecting the buffer LCB to the flip-flop F/F are set (S60). Each of the mesh wirings CMW and the sub wirings SW transmits a clock signal to the buffer LCB. Each of the buffer wirings BWs transmits a clock signal from the buffer LCB to the flip-flop F/F. A mesh pitch $P_{CMW}$ of the mesh wiring CMW is larger than the mesh pitch $P_{PM}$ of the pseudo mesh PM. In other words, the mesh pitch $P_{CMW}$ is larger than a length between two adjacent buffers LCBs. A plurality of buffers LCBs can be arranged in one lattice of the mesh wiring CMW.

Thereafter, the positions of the flip-flops F/Fs and the buffers LCBs are fixed and the other circuit elements corresponding to the flip-flops F/Fs and the buffers LCBs are rearranged (S70). As a result, the layout of the circuit elements and the wirings of the LSI are decided.

If the wirings are provided at the same mesh pitch as that of the pseudo mesh PM as shown in the conventional technique, a total wiring length is increased. The increase in the total wiring length disadvantageously increases not only wiring cost but also the power consumption of the LSI. According to the first embodiment, by contrast, the mesh pitch $P_{CMW}$ of the mesh wiring CMW is set larger than the mesh pitch $P_{PM}$ of the pseudo mesh PM. It is, therefore, possible to save a wiring material and reduce the total power consumption of the LSI as compared with the conventional technique. Furthermore, because the mesh pitch $P_{CMW}$ of the mesh wiring CMW is larger than the mesh pitch $P_{PM}$ of the pseudo mesh PM, the regions for arranging the circuit elements other than the flip-flops F/Fs and the buffers LCBs can be secured. It is thereby possible to reduce a circuit area of the entire LSI.

According to the first embodiment, the buffers LCBs are not set at all the intersecting points of the pseudo mesh PM but only at the closest intersecting points to the flip-flops F/Fs. Therefore, unnecessary buffers LCBs are not present, so that the chip area can be saved and the power consumption of the total LSI can be further reduced.

According to the first embodiment, the buffers LCBs are arranged according to the mesh pitch $P_{PM}$ of the pseudo mesh PM, so that the length between the buffer LCB and the flip-flop F/F is equal to or smaller than the mesh pitch $P_{PM}$. It is, therefore, possible to suppress the skew to be equal to or lower than a predetermined value based on the mesh pitch $P_{PM}$ similarly to a conventional mesh distribution scheme (see Patent Document 1). Moreover, because the length between the buffer LCB and the flip-flop F/F is equal to or smaller than the mesh pitch $P_{PM}$, slew rate can be suppressed low and SI (Signal Integrity) resistance can be secured.

In this manner, according to the first embodiment, the LSI the power consumption and circuit area of which are reduced while the clock skew and the slew rate are suppressed can be realized.

Second Embodiment

In a second embodiment of the present invention, the mesh pitch $P_{PM}$ of the pseudo mesh PM is changed according to the density of flip-flops F/Fs. The other configurations of the second embodiment can be similar to those of the first embodiment. FIGS. 6 to 9 are conceptual diagrams showing a method of designing the LSI according to the second embodiment. FIGS. 6 to 9 correspond to FIGS. 2 to 5 of the first embodiment, respectively, but a density of flip-flops F/Fs in the group 3 according to the second embodiment differs from that of the first embodiment. In the second embodiment, the density of the flip-flops F/Fs in the group 3 is lower than those of the flip-flops F/Fs in the groups 1 and 2. The other configurations shown in FIGS. 6 to 9 can be similar to those shown in FIGS. 2 to 5, respectively. A design flow according to the second embodiment is identical with that shown in FIG. 1.

Figure 6:
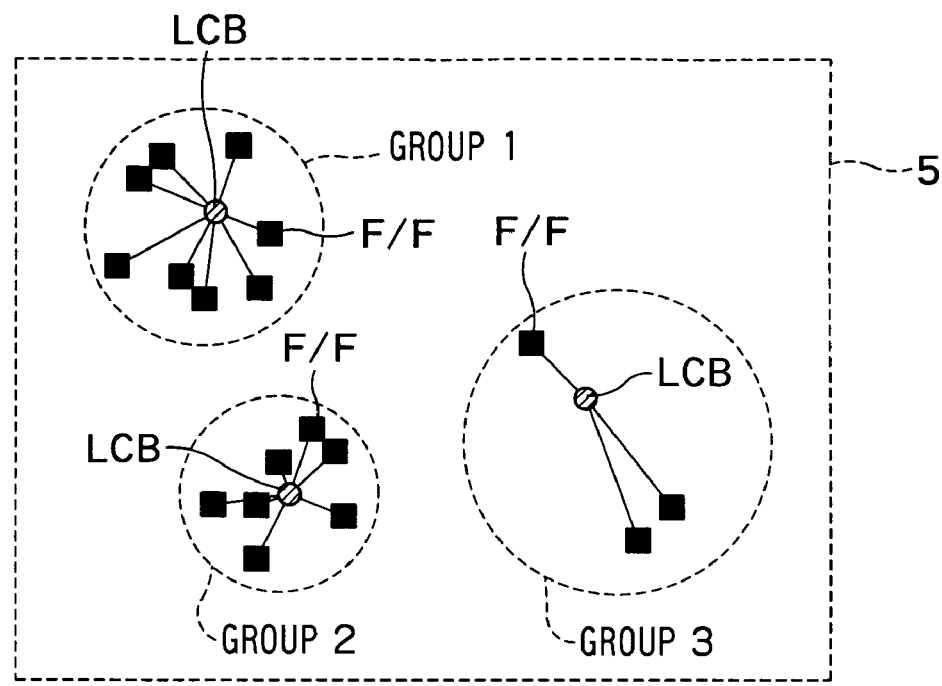
FIG. 6 is a conceptual diagram showing a method of designing the LSI according to the second embodiment.

As shown in FIG. 6, the flip-flops F/Fs and the buffers LCBs are logically arranged (S10) and the buffers LCBs are temporarily deleted (S20).

Figure 7:
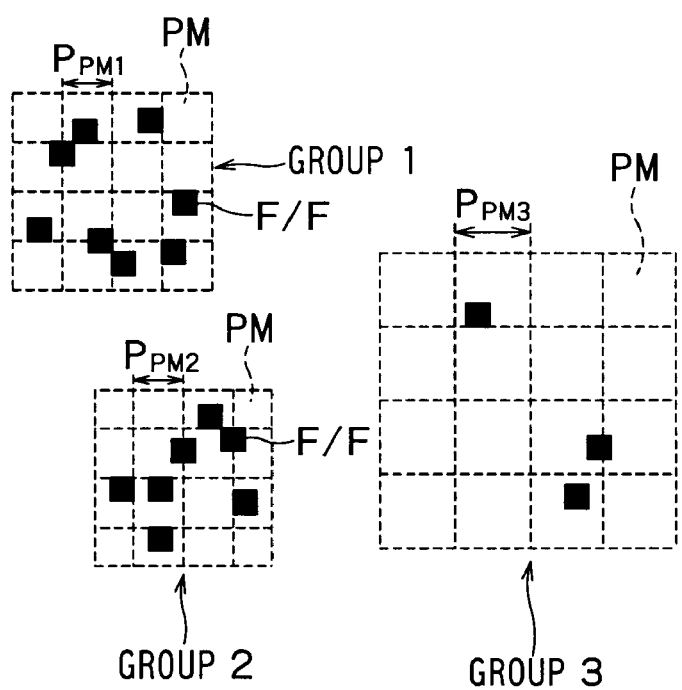
FIG. 7 is a conceptual diagram showing the method of designing the LSI according to the first embodiment.

As shown in FIG. 7, pseudo meshes PMs are assumed. The pseudo meshes PMs are set to correspond to the groups 1 to 3 so as to cover up respective regions of the groups 1 to 3. The mesh pitch of the pseudo mesh PM is decided according to the density of the flip-flops F/Fs in each group. For example, the numbers of flip-flops F/Fs present in the groups 1 to 3 are divided by areas S1 to S3 of the pseudo meshes PMs in the groups 1 to 3, respectively. Namely, N1/S1, N2/S2, and N3/S3 are calculated. Accordingly, the mesh pitches $P_{PM}$ of the pseudo meshes PMs in the groups 1 to 3 can be decided to be inversely proportional to the N1/S1, N2/S2, and N3/S3, respectively.

In the second embodiment, the density of the flip-flops F/Fs in the group 3 is obviously smaller than those of the flip-flops F/Fs in the groups 1 and 2. Therefore, a mesh pitch $P_{PM3}$ of the pseudo mesh PM in the group 3 is set larger than a mesh pitch $P_{PM1}$ of the pseudo mesh PM in the group 1 and a mesh pitch $P_{PM2}$ of the pseudo mesh PM in the group 2. If N3/S3=½(N1/S1)=½(N2/S2), for example, the mesh pitch $P_{PM3}$ of the pseudo mesh PM in the group 3 can be set to satisfy $P_{PM3}=2P_{PM1}=2P_{PM2}$.

Figure 8:
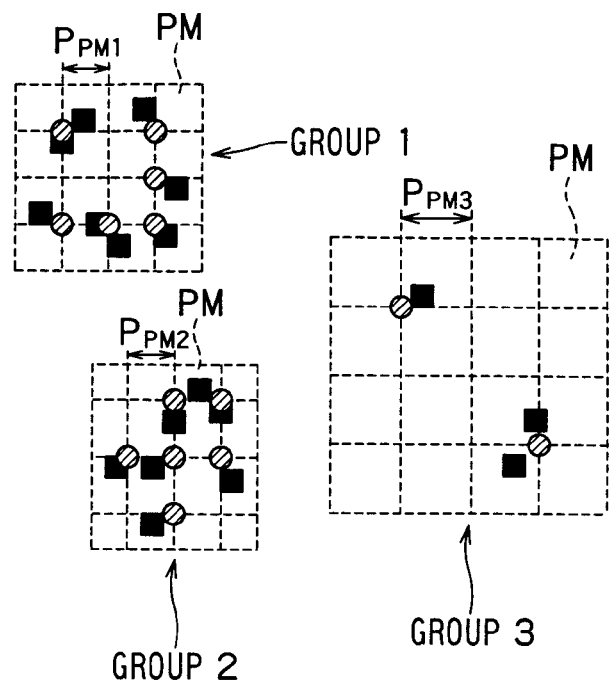
FIG. 8 is a conceptual diagram showing the method of designing the LSI following FIG. 2.
Figure 9:
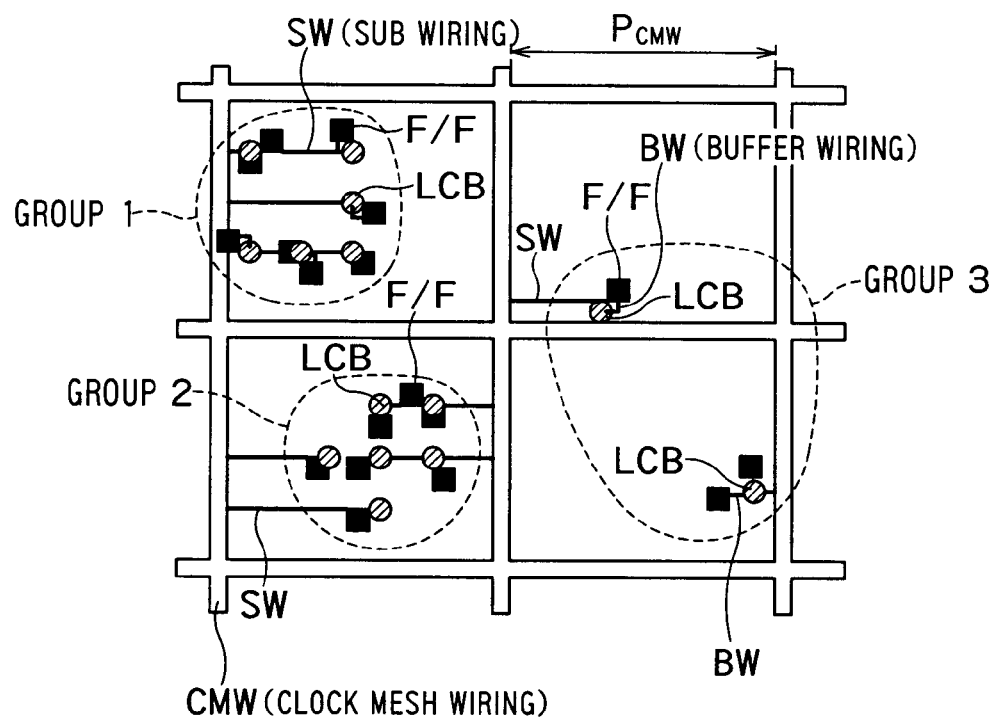
FIG. 9 is a conceptual diagram showing the method of designing the LSI following FIG. 3.

As shown in FIG. 8, positions of the buffers LCBs are set only at closest intersecting points to the respective flip-flops F/Fs among those of the pseudo meshes PMs (S30). Furthermore, after the steps S40 to S60, the mesh wirings CMWs, the sub wirings SWs, and the buffer wirings BWs are set as shown in FIG. 9.

In the second embodiment, the mesh pitch $P_{PM3}$ of the pseudo mesh PM in the group 3 is larger than the mesh pitches $P_{PM1}$ and $P_{PM2}$ in the groups 1 and 2. Due to this, the length between the flip-flop F/F and the buffer LCB in the group 3 may be larger than those in the groups 1 and 2.

Generally, however, a delay time between the buffer LCB and the flip-flop F/F is almost proportional to a product (R×C) between the wiring resistance (R) from the buffer LCB to the flip-flop F/F and a total capacity (C) of a wiring capacity from the buffer LCB to the flip-flop F/F and a capacity of the flip-flops F/Fs. Due to this, in the group 3 in which the density of the flip-flops F/Fs is low, the capacity of the flip-flops F/Fs is low. As a result, even if the wiring resistance (R) between the buffer LCB and the flip-flop F/F is high, the product (R×C) can be set almost equal to those in the groups 1 and 2.

If the mesh pitches $P_{PM}$ of the pseudo meshes PM are set equal despite the different densities of the flip-flops F/Fs, the buffers LCBs could be arranged at a higher density than an originally necessary density. Namely, the density of the buffers LCBs is set relative to the flip-flops F/Fs in the same group so that the skew is excessively lower than an originally necessary skew.

According to the second embodiment, the buffers LCBs can be arranged so as to efficiently give driving capabilities to the flip-flops F/Fs. The second embodiment is, therefore, more preferable in view of the manufacturing cost, the power consumption, and the circuit area.

Third Embodiment

Figure 10:
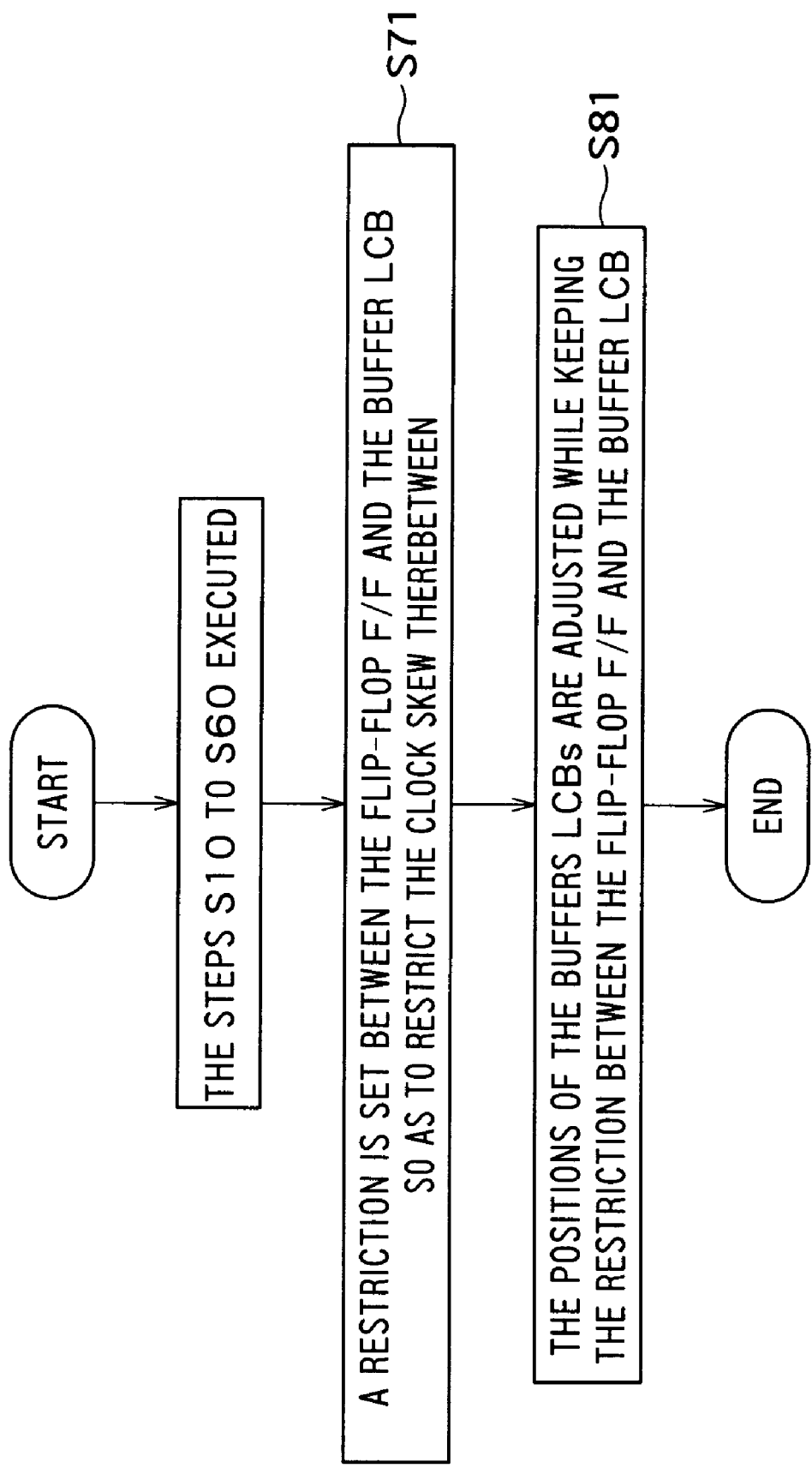
FIG. 10 is a flowchart showing a method of designing an LSI according to a third embodiment of the present invention.

FIG. 10 is a flowchart showing a method of designing an LS1 according to a third embodiment of the present invention. In the third embodiment, position coordinates of the flip-flops F/Fs and buffers LCBs are adjusted while the clock skew and the slew rate between the flip-flop F/F and the buffer LCB are kept to be equal to or lower than respective predetermined values after the step S60 according to the first embodiment.

First, the steps S10 to S60 shown in FIG. 1 are executed. Thereafter, a restriction is set between the flip-flop F/F and the buffer LCB so as to restrict the clock skew therebetween (S71). The positions of the buffers LCBs are then adjusted while keeping the restriction between the flip-flop F/F and the buffer LCB (S81).

Figure 11:
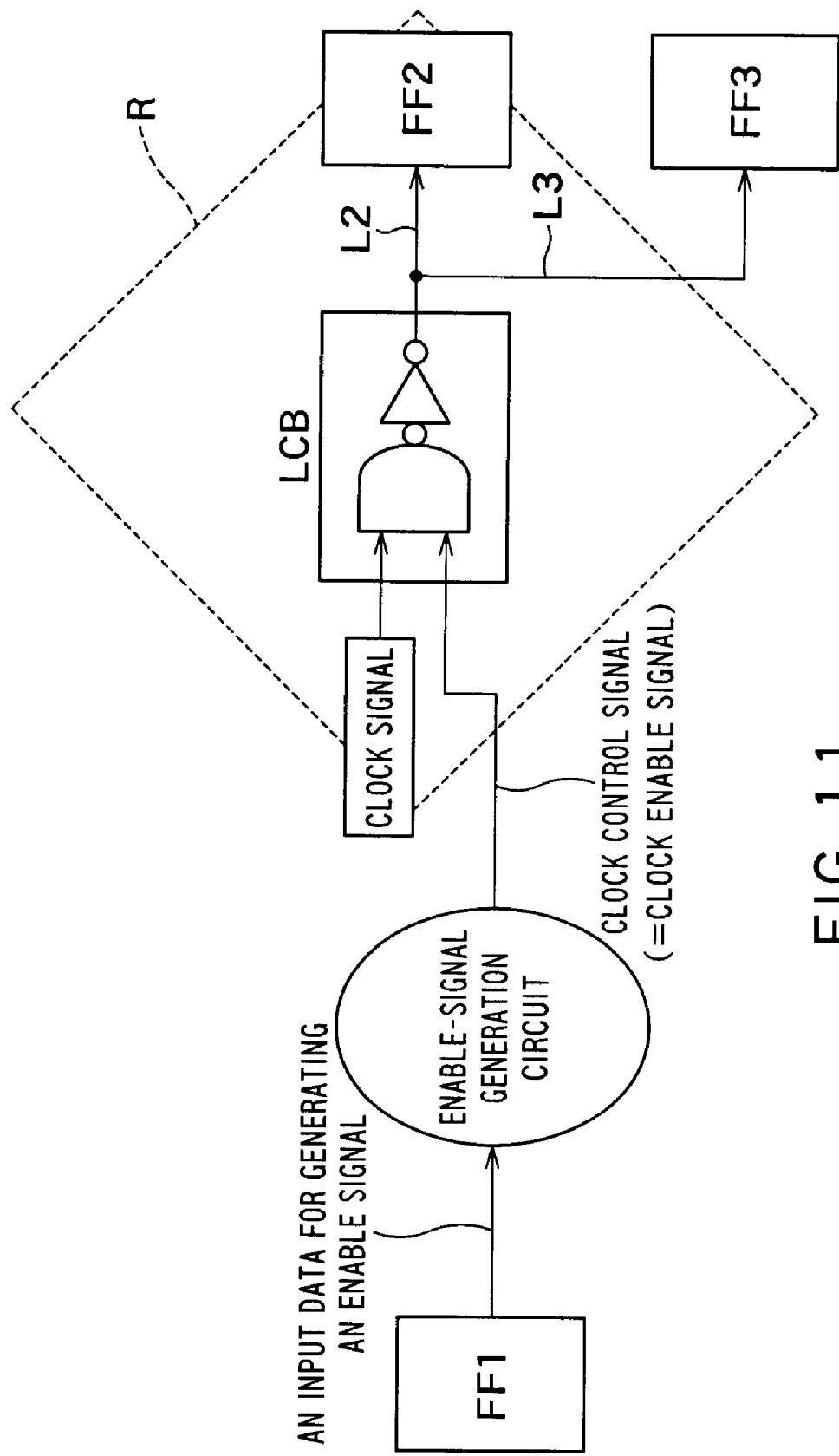
FIG. 11 is a conceptual diagram showing the method of designing the LSI according to the third embodiment.

FIG. 11 is a conceptual diagram showing the method of designing the LS1 according to the third embodiment. A flip-flop FF1 supplies an input data to an enable-signal generation circuit. The input data is used for generating an enable signal. The enable-signal generation circuit generates a clock enable signal to be supplied to a gating logic circuit (e.g., an AND gate shown in FIG. 11) in the buffer LCB, and controls supply of the clock signal passed through the buffer LCB to flip-flops FF2 and FF3.

The gating logic circuit includes, for example, an AND gate that performs an AND operation between the clock signal and the clock enable signal supplied from the flip-flop FF1 and that thereby outputs a driving signal of the flip-flops FF2 and FF3. A gating operation performed by the gating logic circuit is an operation for stopping/starting outputting the clock signal from the buffer LCB to the flip-flops FF2 and FF3.

Generally, the time (delay time) for which the clock control signal arrives at the buffer LCB from the flip-flop FF1 via the enable-signal generation circuit should be equal to or shorter than a predetermined delay time specified according to the frequency of the clock signal. This is because the clock enable signal gives a timing restriction on a clock edge of the clock signal when the clock signal arrives at the flip-flop FF2 or FF3, in the AND gating logic circuit in the buffer LCB. To set this delay time equal to or shorter than the predetermined delay time, the positions of the buffers LCBs are adjusted at the step S81. However, if the positions of the buffers LCBs are simply adjusted, the clock skew between the flip-flop F/F and the buffer LCB is possibly increased.

This is why the positions of the buffers LCBs are adjusted while keeping the restriction between the flip-flop F/F and the buffer LCB set at the steps S10 to S60 in the third embodiment.

The skew depends on the product (R×C) of the wiring between the flip-flop F/F and the buffer LCB as already stated. For this reason, if a wiring width is constant, a maximum wiring length Lmax is set for the wiring between the flip-flop F/F and the buffer LCB as a method for giving the restriction between the flip-flop and the buffer LCB. If a wiring length between the buffer LCB and the flip-flop FF2 is L2 and that between the buffer LCB and the flip-flop FF3 is L3, the positions of the LCBs are adjusted so that the wiring lengths L2 and L3 do not exceed the maximum wiring length Lmax at the step S81.

Alternatively, the method of giving the restriction between the flip-flop F/F and the buffer LCB can be a method of arranging the flip-flops within a certain constant region R around the buffer LCB. For example, the arrangements of the flip-flops F/Fs and the buffers LCBs are restricted such that the flip-flops FF2 and FF3 are arranged in a circular region R around the buffer LCB. In this case, the maximum wiring length Lmax between the buffer LCB and the flip-flop F/F is a radius of the circuit region R. The shape of the region R can be set not only to the circular shape but also to a polygonal shape.

The slew rate of the wiring similarly depends on the product (R×C). Due to this, the method of giving the restriction between the flip-flop F/F and the buffer LCB can be executed in view of the slew rate between the flip-flop F/F and the buffer LCB.

According to the third embodiment, the positions of the buffers LCBs are adjusted while keeping the restriction between the buffer LCB and the flip-flop F/F. It is thereby possible to suppress the delay time of the clock signal from the enable-signal generation circuit to be low, while restricting the clock skew between the flip-flop F/F and the buffer LCB to be equal to or lower than the predetermined value.

The third embodiment can further attain the advantages of the first embodiment. The third embodiment can be combined with the second embodiment. In this case, the third embodiment can attain the advantages of the second embodiment.

Fourth Embodiment

Figure 12:
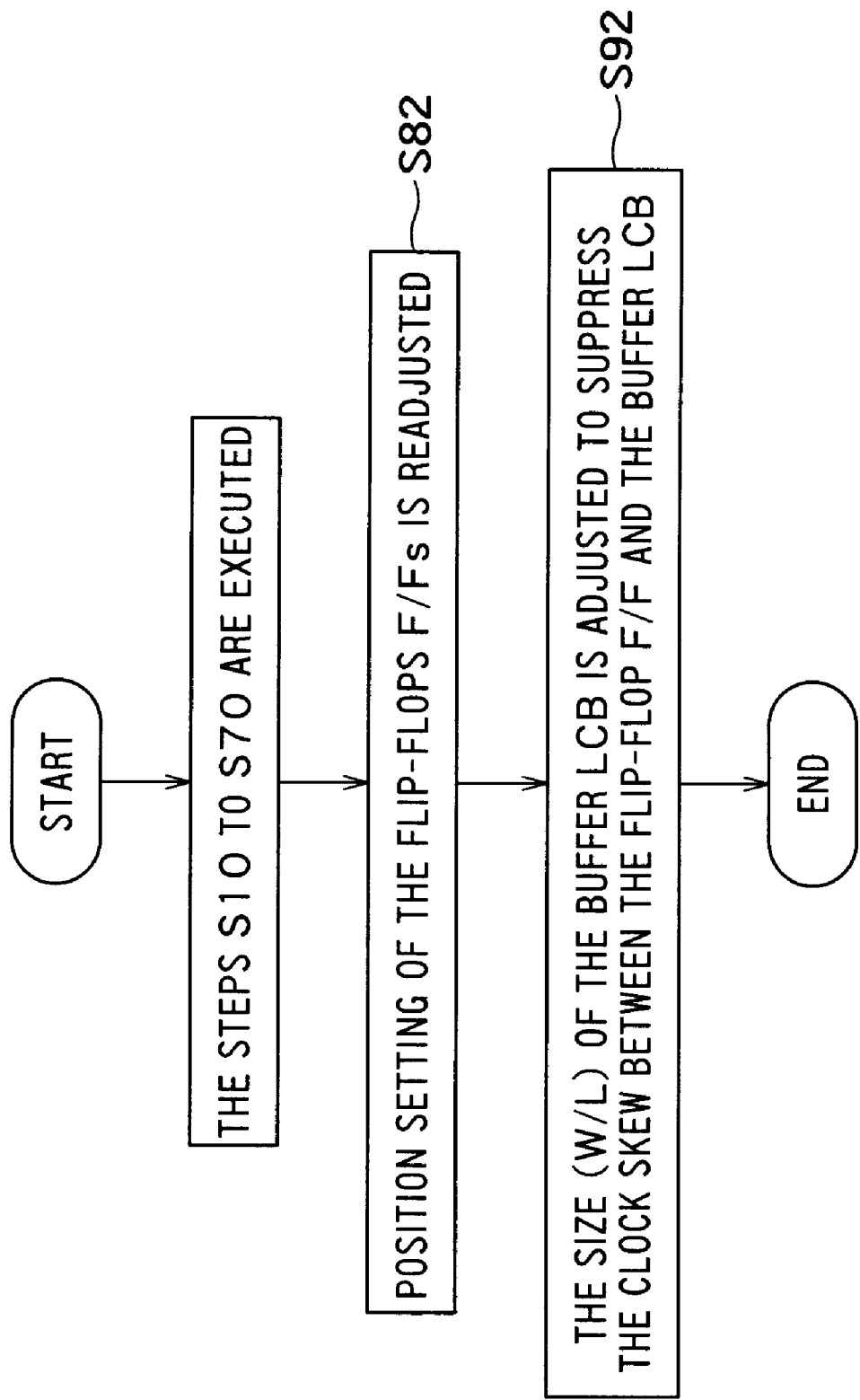
FIG. 12 is a flowchart showing a method of designing an LSI according to a fourth embodiment of the present invention.

FIG. 12 is a flowchart showing a method of designing an LS1 according to a fourth embodiment of the present invention. In the fourth embodiment, position setting of the flip-flops F/Fs is readjusted (S82) after the step S70 according to the first embodiment. At the steps S10 to S70, the positions of the flip-flops F/Fs and the buffers LCBs are set while the skew between each flip-flop F/F and each buffer LCB is restricted. However, it is often necessary to readjust the positions of the flip-flops F/Fs so as to appropriately set timings for transmitting and receiving the signal between the flip-flops F/Fs.

After adjusting the positions of the flip-flops F/Fs, the size (W/L) of the buffer LCB is adjusted to suppress the clock skew between the flip-flop F/F and the buffer LCB (S92). For example, if the flip-flop F/F is away from the buffer LCB at the step S82, the skew increases. To suppress this skew, the current driving capability of the buffer LCB is increased by increasing the size of the buffer LCB at the step S92.

According to the fourth embodiment, the timings of the signal between the flip-flops F/Fs can be optimized, while suppressing the clock skew between the flip-flop F/F and the buffer LCB. Further, the fourth embodiment can attain the advantages of the first embodiment.

The fourth embodiment can be combined with the second embodiment. In this case, the fourth embodiment can attain the advantages of the second embodiment.

Fifth Embodiment

Figure 13:
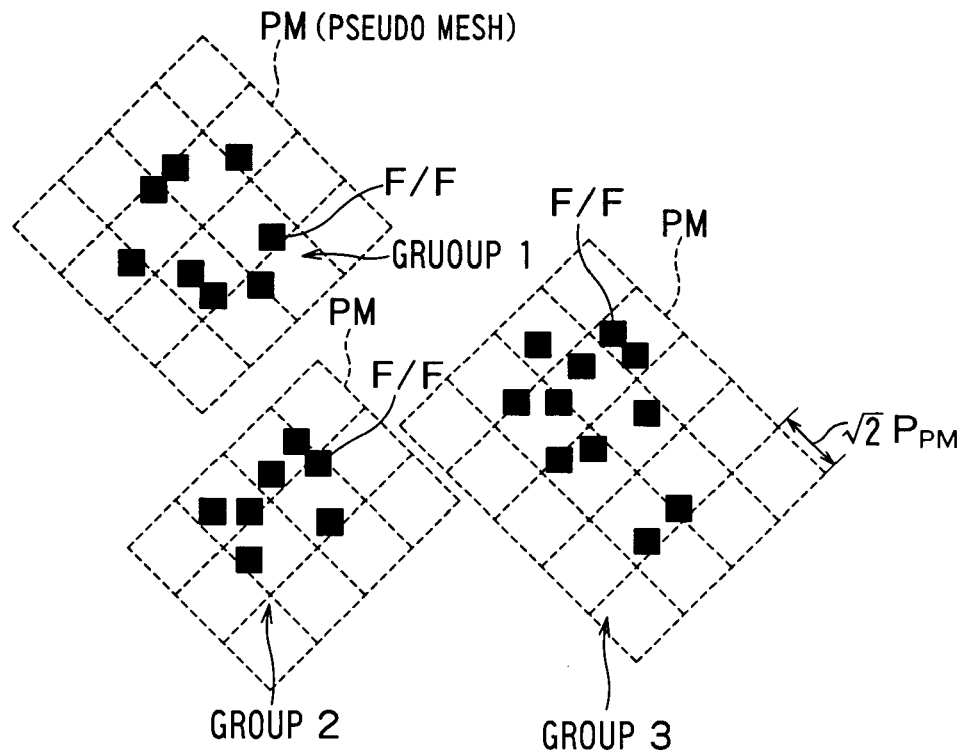
FIG. 13 is a conceptual diagram showing an LSI that is being designed according to a fifth embodiment of the present invention.

FIG. 13 is a conceptual diagram showing an LS1 that is being designed according to a fifth embodiment of the present invention. The design flow according to the fifth embodiment is identical with that shown in FIG. 1. Furthermore, the positions of the flip-flops F/Fs and the synthetic arrangement of the logical buffers LCBs are similar to those shown in FIG. 2.

Each of the mesh wirings CMW, the sub wirings SW, the buffer wirings BW and the like is to be formed in a perpendicular direction vertically and horizontally. In the first embodiment, the pseudo mesh PM extends in parallel or perpendicular to wiring formation direction of the mesh wirings CMW, the sub wirings SW, the buffer wirings BW and the like. In the fifth embodiment, the pseudo mesh PM is inclined with respect to the wiring formation direction. The pseudo lines of the pseudo mesh PM according to the fifth embodiment is, for example, inclined at an angle of 45 degrees with respect to the wiring formation direction. The pseudo lines of the pseudo mesh PM is virtual lines which are utilized to determine the arrangement of the buffers LCBs and which are not formed as actual wirings.

Figure 14:
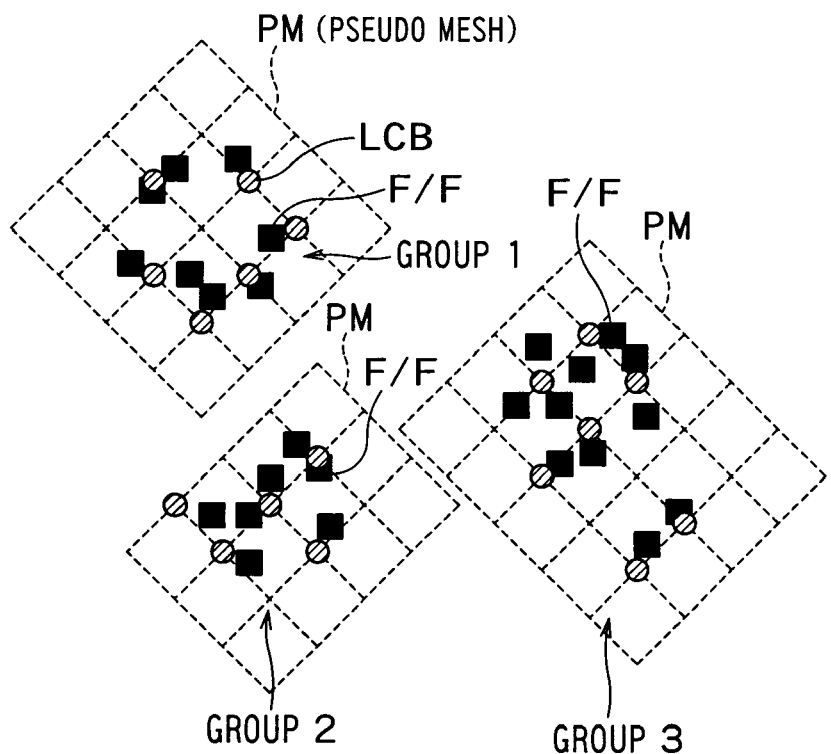
FIG. 14 is a conceptual diagram showing the method of designing the LSI following FIG. 13.

FIG. 14 is a conceptual diagram showing a method of designing the LS1 subsequent to FIG. 13. The buffers LCBs are arranged at the closest intersecting points to the flip-flops F/Fs in design.

Figure 15:
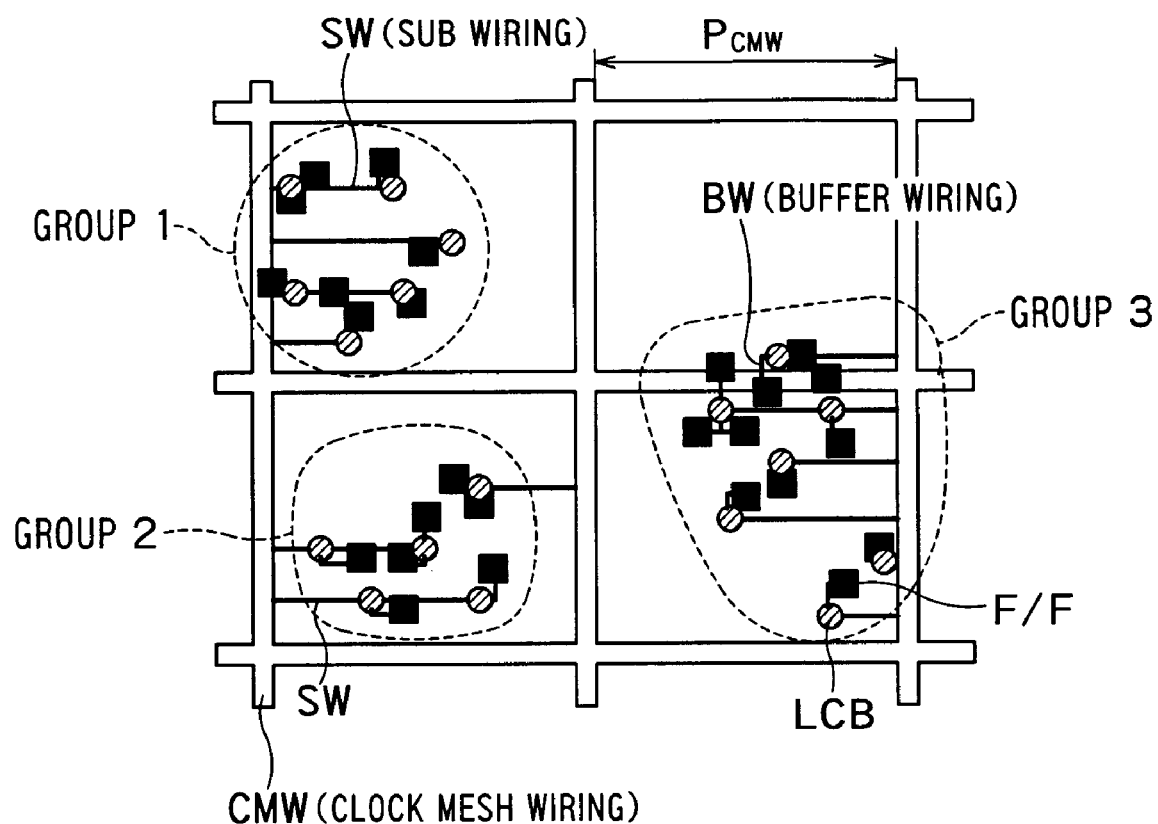
FIG. 15 is a conceptual diagram showing the method of designing the LSI following FIG. 14.

FIG. 15 is a conceptual diagram showing the method of designing the LS1 subsequent to FIG. 14. In FIG. 15, the mesh wirings CMWs serving as the main wirings, the sub wirings SWs each connecting the mesh wiring CMW to the buffer LCB, and the buffer wirings BWs each connecting the buffer LCB to the flip-flop F/F are set.

Figure 16:
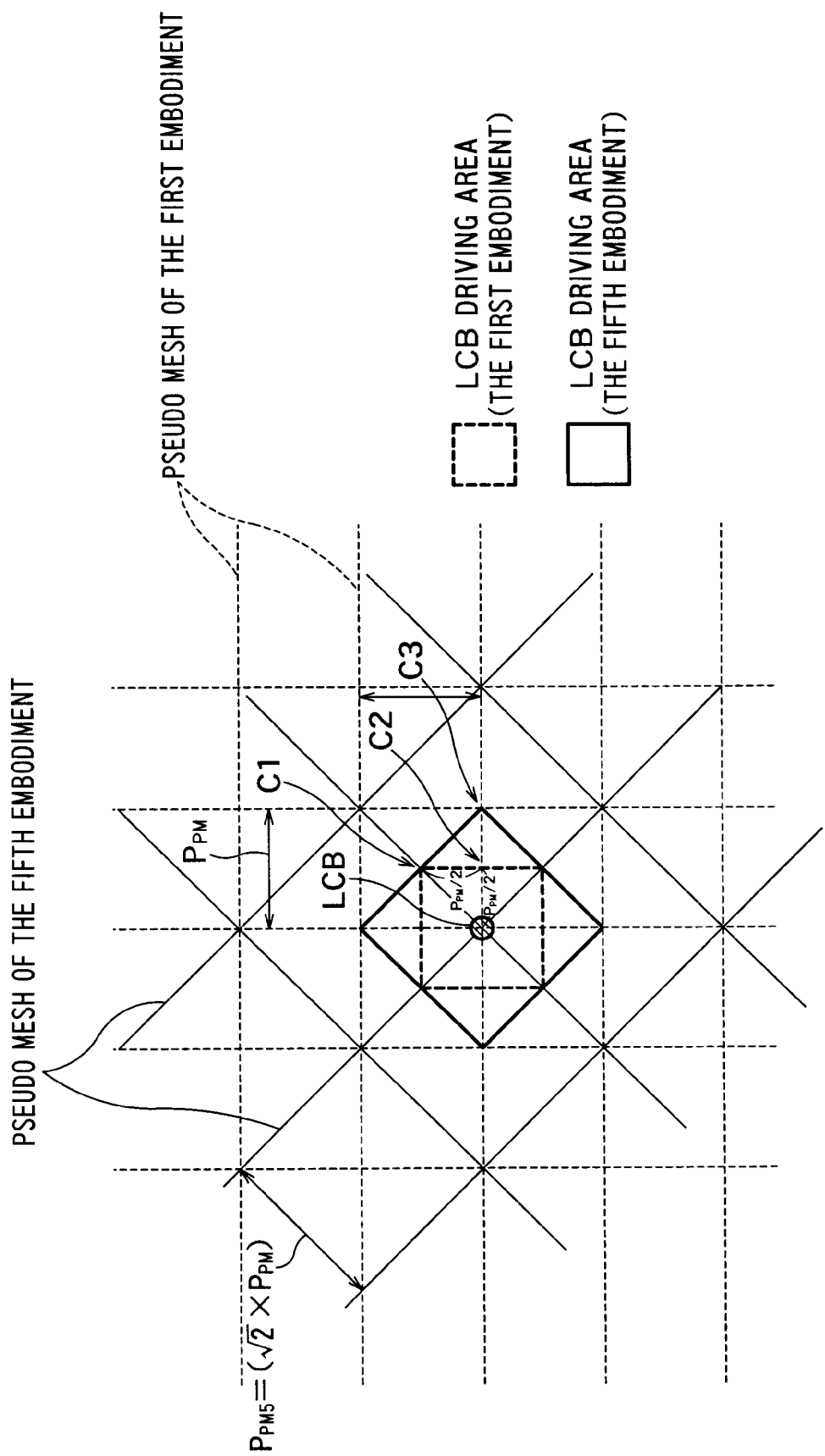
FIG. 16 is a conceptual diagram showing pseudo meshes of the first and the fifth embodiments and showing the areas in which a buffer LCB is able to drive elements in the first and the fifth embodiments, respectively.

Generally, the buffer wirings BWs are provided in parallel or perpendicular to the wiring formation direction. It is, therefore, necessary to set a Manhattan distance between the buffer LCB and the flip-flop F/F to be equal to a wiring distance of each buffer wiring BW. The Manhattan distance means a distance of a segment constituted by a line extending either in parallel or perpendicular to the wiring formation direction. For example, the Manhattan distance from the LCB to an intersecting point C1 shown in FIG. 16 is a sum between a linear distance from the LCB to an intersecting point C2 and a linear distance from the intersecting point C2 to the intersecting point C1. In the present specification, "wiring distance" means the Manhattan distance.

FIG. 16 shows pseudo meshes of the first and the fifth embodiments and shows the areas in which a buffer LCB is able to drive elements in the first and the fifth embodiments, respectively. In the embodiment shown in FIG. 16, a mesh pitches $P_{PM5}$ of the pseudo mesh of the fifth embodiment is $2^{1/2}$ times of the pitch $P_{PM}$ of the pseudo mesh of the first embodiment. The maximum wiring distance between the buffer LCB and the flip flop F/F in the first embodiment is $P_{PM}$, and that in the fifth embodiment is $(2^{1/2})P_{PM5}$. Therefore, if $P_{PM5}=(2^{1/2})P_{PM}$ as shown in FIG. 16, the maximum wiring distance between the buffer LCB and the flip flop F/F in the fifth embodiment is equal to that in the first embodiment. As a result, when the maximum wiring distances in the first and the fifth embodiments are equal each other, the buffer LCB according to the fifth embodiment can drive the flip flops F/Fs disposed in an area as two times as an area in which the buffer LCB according to the first embodiment can drive the flip flops F/Fs. In particular, the area in which one buffer LCB can drive the flip flops F/Fs is $(P_{PM})^2$ in the first embodiment and is $(P_{PM5})^2=2*(P_{PM})^2$ in the fifth embodiment.

This means that the number of buffers LCBs arranged in the fifth embodiment is closer to half the number of buffers LCBs in the first embodiment as the number of flip-flops F/Fs is larger. The LS1 designed by the method according to the fifth embodiment can further reduce the power consumption and the manufacturing cost.

The advantage described above is the advantage obtained when the mesh pitch $P_{PM5}$ in the fifth embodiment is $(2^{1/2})$ times of the mesh pitch $P_{PM}$ in the first embodiment. However, the mesh pitch in the fifth embodiment may be same as the mesh pitch in the first embodiment. In this case, the area in which one buffer LCB can drive the flip flops F/Fs in the fifth embodiment is same as that in the first embodiment. Therefore, the maximum wiring distance between the buffer LCB and the flip-flop F/F in the fifth embodiment can be shorter than that of the first embodiment. As a result, the fifth embodiment can reduce the delay of the clock signal and the skew less than the first embodiment.

The fifth embodiment can be applied to the second to fourth embodiments. If the fifth embodiment is applied to the second embodiment, the pitch of the pseudo mesh PM can be set different among the groups 1 to 3 shown in FIG. 7 according to the density of the flip-flops F/Fs. By setting so, the fifth embodiment can also attain the advantages of the second embodiment. If the fifth embodiment is applied to the third embodiment, it suffices to execute the steps S71 and S81 shown in FIG. 10 after setting the mesh wirings CMWs and the like. By doing so, the fifth embodiment can further attain the advantages of the third embodiment. If the fifth embodiment is applied to the fourth embodiment, it suffices to execute the steps S82 and S92 shown in FIG. 12 after fixing the positions of the buffers LCBs and the flip-flops F/Fs. By doing so, the fifth embodiment can further attain the advantages of the fourth embodiment.

In the embodiments described above, the main wirings CMWs are formed in mesh shape. However, as long as the clock signals can be transmitted to the buffers LCBs within a predetermined skew, the main wirings may be other shapes except for the mesh shape. The main wirings, for example, may be a tree shape.

Further, when there are plurality of groups of the flip flops F/Fs, regions in which the groups disposed may be overlapped each other.

The invention claimed is:

1. A semiconductor integrated circuit device comprising:
   a plurality of circuit elements arranged in a chip and operating in response to a same clock signal;
   clock buffers arranged at intersecting points decided based on positions of the plurality of circuit elements, the intersecting points being included in intersecting points of a pseudo mesh virtually assumed to conceptually cover up a region in the chip including the plurality of circuit elements; and
   a main wiring transmitting the clock signal to the clock buffers, wherein
   the pseudo mesh is a different mesh from a wiring mesh of the main wiring, and
   the main wiring is shaped into a mesh at a larger mesh pitch than a mesh pitch of the pseudo mesh.

2. The semiconductor integrated circuit device according to claim 1, wherein a pseudo line of the pseudo mesh is inclined with respect to a wiring formation direction.

3. The semiconductor integrated circuit device according to claim 1, wherein a pseudo line of the pseudo mesh is inclined at an angle of 45 degrees with respect to a wiring formation direction.

* * * * *